J. E. RALPH.
CARD FOR CARD INDEXES.
APPLICATION FILED OCT. 12, 1908.

1,114,518.

Patented Oct. 20, 1914.
2 SHEETS—SHEET 1.

Witnesses
Inventor
Joseph E. Ralph
By Mason Fenwick & Lawrence
Attorneys

J. E. RALPH.
CARD FOR CARD INDEXES.
APPLICATION FILED OCT. 12, 1908.
1,114,518.
Patented Oct. 20, 1914.
2 SHEETS—SHEET 2.
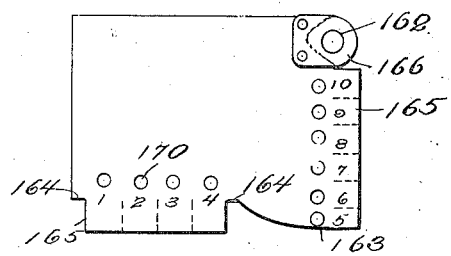
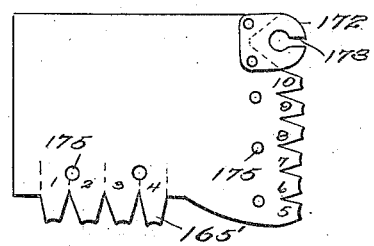
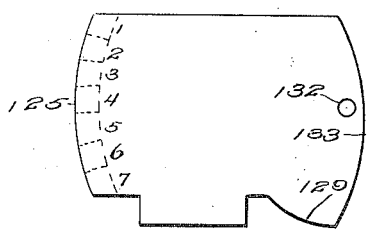
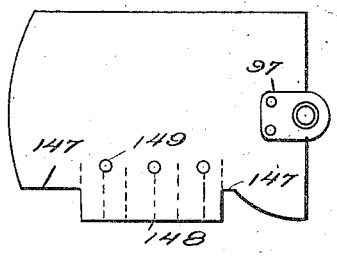
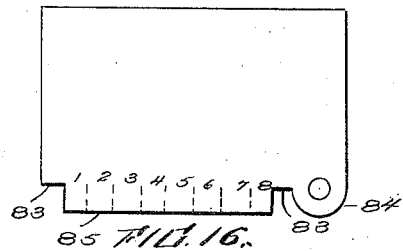
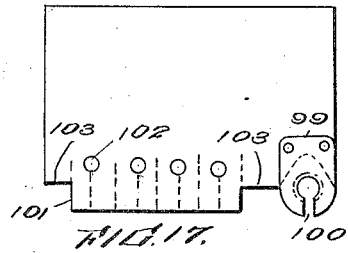
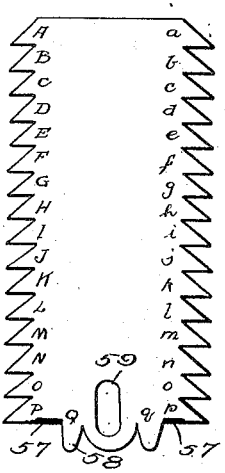
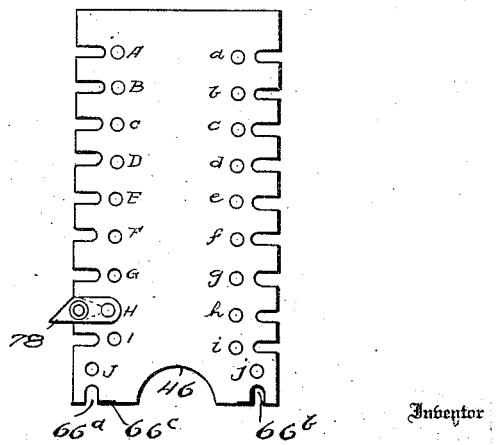
Witnesses
R. F. Trogner.
W. H. Wakefield
Inventor
Joseph E. Ralph
By Mason Fenwick & Lawrence
Attorneys

UNITED STATES PATENT OFFICE.

JOSEPH E. RALPH, OF NEWARK, NEW JERSEY.

CARD FOR CARD-INDEXES.

1,114,518. Specification of Letters Patent. Patented Oct. 20, 1914.

Application filed October 12, 1908. Serial No. 457,317.

*To all whom it may concern:*

Be it known that I, JOSEPH E. RALPH, a citizen of the United States, residing at Newark, in the county of Essex and State of New Jersey, have invented certain new and useful Improvements in Cards for Card-Indexes; and I do hereby declare the following to be a full, clear, and exact description of the invention, such as will enable others, skilled in the art to which it appertains to make and use the same.

The present invention relates to cards for card indexes and an object of the same is to provide improved means for supporting the card and also for positioning the card so that the upright edges of the card will be in alinement.

A still further object of the invention is to provide a card of this general description with projections which may be actuated by suitable selective means in a container for the cards, the projections in certain of the cards being serrated for engagement with the selective means.

With these and other objects in view, the invention comprises certain new and useful constructions, arrangements and combinations of parts as will be hereinafter described and claimed.

Figure 1:
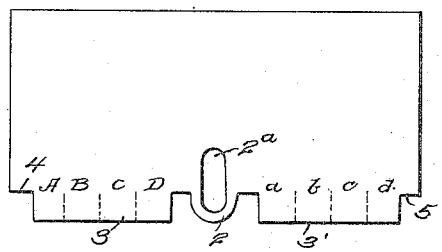
Figure 2:
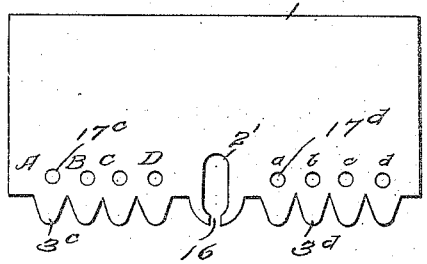
Figure 3:
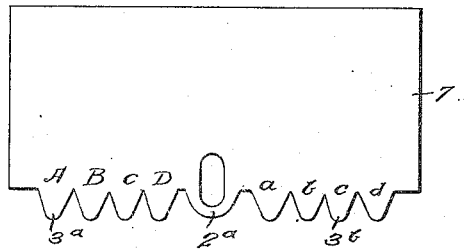
Figure 4:
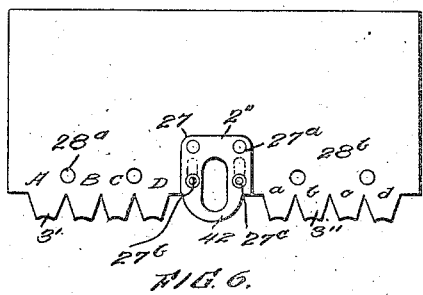
Figure 5:
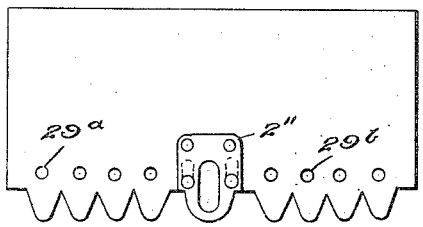
Figure 6:
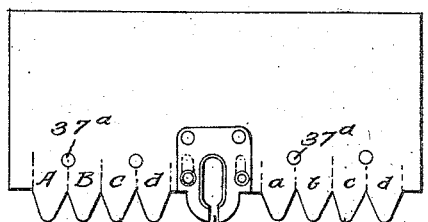
Figure 7:
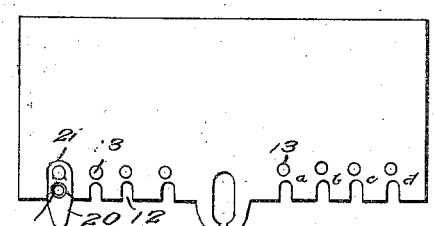
Figure 8:
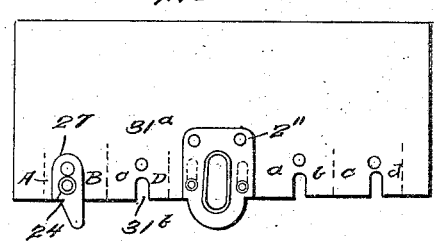
Figure 9:
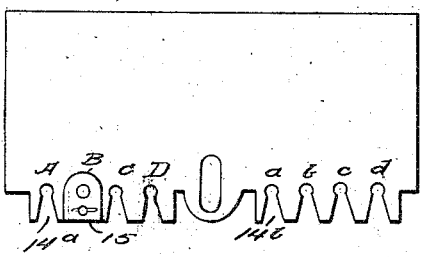

In the accompanying drawings: Figure 1 is a plan view of a card embodying the features of the present invention. Fig. 2 is a plan view of a slightly modified form of card shown in Fig. 1, the same having an orifice for receiving a locking rod, and arranged with a slot for withdrawal or insertion of a card over the locking rod, and slightly modified governing means. Fig. 3 is a plan view of a card constructed with an orifice for receiving a locking rod similar to the orifice in Fig. 1, but arranged with a slightly different form of governing members. Fig. 4 is a plan view of a card having secured thereto a positioning member attachment, and governing members having concaved ends. Fig. 5 is a plan view of a card arranged with an attached positioning member secured on the bottom edge near the center thereof and formed with governing members having rounded ends. Fig. 6 is a plan view of a card similar to the card shown in Fig. 4, except the positioning member attachment is formed with a slot and the governing members are formed with rounded ends. Fig. 7 is a plan view of a card arranged with a positioning member having a slot formed therein similar to the positioning member shown in Fig. 2, but with a slightly modified form of governing members arranged for receiving a governing member attachment. Fig. 8 is a plan view of a card similar to the card shown in Fig. 7, but arranged with a positioning member similar to that shown in Fig. 20, and a slightly modified form of governing member attachment. Fig. 9 is a plan view of a card arranged with a positioning member similar to the positioning member shown in Fig. 1, but arranged with notches for receiving governing member attachments. Fig. 10 is a plan view of a card having a pivotal point and a locking rod attachment in one of its upper corners, serially marked indicated governing members with apertures opposite each of the governing members, rests, and a positioning member on the same end but at the opposite corner to the pivotal point. Fig. 11 is a slightly modified form of the card shown in Fig. 10. Fig. 12 is a plan view of a card arranged with a locking rod opening at its pivotal point near the middle of one end and formed with arc shaped ends permitting movement of the card at its pivotal point. Fig. 13 is a slightly modified form of card to that shown in Fig. 12. Fig. 14 is a plan view of a card arranged with a positioning member at the lower corner thereof and clearly indicated serially marked governing members. Fig. 15 is a slightly modified form of card to that shown in Fig. 14. Fig. 16 is a plan view of a card in which the governing members are indicated on each side thereof and serially marked, the card being provided at its lower end with a positioning member. Fig. 17 is a plan view of a card similar to the card shown in Fig. 16, except that the same is provided with notches and apertures for receiving governing member attachments.

In constructing cards according to the present invention the aim is to provide cards just as readily usable in an automatic selective card index container as the conventional cards are in the containers in common use, all of the cards in a complement being made exactly alike, and each card being provided with a selection or governing member for each subject or class that was to be selected. Each card will also be provided with rests on its bottom edge to sustain its weight while in normal position and maintain its governing members just clear of contact with the action and wear of the selecting devices of the container, except when those are actuated that relate to subjects indorsed upon the cards.

Another general feature is that all these forms of cards are equally serviceable in both containers having an inside tray or cradle that makes selections by maintaining the selections in normal position and lowering to a distinct position those not wanted and in those containers in which the selections are made by projecting cards to a distinguishing position above the mass of the cards.

Figs. 1 to 9 show a card and the principal modifications thereof suitable for use in a container adapted to make selections by the relationship of the card to a subject in one or both of two selective lists having the entire formation preferably cut from a single piece of stock or of a card combined with attachments. The cards are adapted to receive and be actuated with simple locking rods or with rods that permit removal of the card when the rod is in a certain position and whether or not the governing members are simply indicated, as by printing, cut to a shape from the card; in the form of means to secure projecting attachments or in form of a recess on the edge that is susceptible of closure by the insertion of an attachment. The selective range of these cards is limited to the number of feasible subdivisions of the lower edge that is not required for the positioning member and the rest spaces. The card and its modifications shown in Figs. 1 to 9 have each eight governing members or means to attach governing members spaced along the bottom edge and when placed in a suitable container could be used for data divided into eight selective divisions grouped in a single list or could be used for data divided into sixteen selective divisions by grouping the divisions in two lists as will be seen by the individual description of its figures referred to hereinafter.

Fig. 1 is a plan view of a card 1 cut in its entirety from a single piece of card stock having a positioning member 2 with its outline in the form of a segment of a circle that has its center coincident with the lower center of the lock rod opening 2ª which has an elongated form to permit vertical as well as oscillatory movement. This positioning member is placed approximately at the center of the lower edge of card 1 so that the groups of indicated governing members 3 and 3' will be on opposing sides of the positioning member 2 and the center of gravity. Governing members 3 and 3' are shown serially marked alphabetically with capitals and small letters but any serial marking can be employed that will readily identify the same member on all the cards of a complement and be convenient to indicate its place relationship on the list of selective subjects. Their location, size and line of severance from the body of the card are, in this instance, clearly indicated by printing so that in use the exact size, shape and position of the members to be retained to make the card selective when inscribed data is desired is positively known and the lines of severance for the removal of the undesired governing members is clearly shown. This removal may be by means of a knife, scissors or other cutting tool or by means of a special hand tool with suitable stops and guides to accurately cut-away a governing member or a larger tool that can be accommodatingly arranged to cut away all, or any desired governing members at one motion. Also on the bottom edge of card 1 and still farther to either side of the centrally located positioning member 2 are seen two rest-spaces 4 and 5. This extreme proximity to the ends is usually most desirable as this location tends to steadiness and positiveness in the several actions but the only essential is that a rest-space or rest-spaces will be so formed as to support the weight of the card while in normal position and maintain the ends of the governing members in use sufficiently beyond the contact of the selecting means of the container while making selections of other cards.

If a complement of such cards as shown in Fig. 1 were to be used in the real estate business A might mean one family house, B two family, C three family, and D apartment house, and a constructed of frame, b of brick, c with an extra lot, and d with a stable. When a new parcel of property was to be listed any unused card could be taken and the usual data inscribed thereon and this could be as is at present customary by filling in a form on its face or faces prepared by printing and ruling which would naturally be arranged so that the street and house number could appear prominently near the upper edge. If such a card for each property registered in an office was placed in a selective container arranged with an inner tray that made its selections by retaining them in their normal position the positioning member 2 would movably fit the trough-like positioning means of the tray while the rest-spaces 4 and 5 came into positive and supporting contact with rest-ledges at the sides of the tray thus bringing the governing members 3 and 3' opposite and in alinement with their respective selectors in the lower part of the container. If the tray was in its normal or upper position lock rod opening 2' would be in position to receive a rod through its lower portion and its variance of center would be such that when the cradle was lowered the lock rod would be in its upper position. As the projecting depth of the governing members 3 and 3' that were left upon the cards was also equal (with an allowance for clearance) to the up and down movement of the inner tray, the movement of the tray would not cause a contact and consequent selection unless some of the container's selectors were in selective position. The operative movement of the selectors would be a vertical parallel rise at all points of its length equal to the down motion of the cradle by which means its upper edge when operated is just sufficiently below the plane of the lower ends of the governing members to be clear then while the tray was in upper or normal position and as each selector runs under the entire mass of contained cards at a right angle to the plane of their faces at their lower edge, it is evident if any selector is operated all contained cards retaining a governing member relating to the subject selective by means of any particular selector will come in contact with that selector when it is operated and be retained in their normal position while the balance of the cards still supported by their rest-spaces 4 and 5 resting on the ledges provided in the tray will descend with the tray to a distinctive position. This would be true whether the lock rod was in position or not as its only function is to prevent the withdrawal of cards while it is in position. If then with such cards in such a container selections were desired according to a single list or group the operation would be as follows: If a necessity to select all the one family houses arose the operator would set or actuate the selector relating thereto accurately selecting it by means of the index on the face of the container or elsewhere and operate the cradle thus retaining in normal position all tht cards retaining the governing member 3 serially marked A, for all "A" governing members would come into contact with the one family house (A) selector and hold the left corner of the cards to which they were attached at normal height while the other corner and the unselected cards would descend with the tray to a lower level thus leaving the selected cards in a clearly distinguishable position. This selective action would be almost instantaneous and the location of the properties thus disclosed would be easily ascertained by the customary method of examining the upper edge and they could be further and fully examined by withdrawing them in the usual way according to the use or style of locking rod. By restoring the cradle and selector to their normal positions other selections could be made by similar manipulations such as a selection of properties having a stable on the lot or in connection with a dwelling. As a result of this second selection such of the cards in the first selection as had a stable recorded as part of the adjuncts of the one family house would appear.

If then the cards were placed in a similar selective container but operated to make selections from a double list it is evident that the selection of one family houses could be made as before by using only the container selector operating to make a retaining contact with governing members serially marked "A" or properties with stables by using only the selector for "d" governing members but that if both the selectors for "A" and "d" governing members were actuated or set before operating the cradle the result would be that all the cards containing both subjects would have both their upper corners retained in normal position or in other words they would remain exactly as they were normally with their upper edges at an even parallel elevation above the mass of cards that had dropped with the cradle to a lower level. From this ability to make a selection that relates at once to two subjects such cards in suitable containers would have a wide range of usefulness in other lines than real estate as for instance the grouping of the names of customers and correspondents by lines of business in one selective group and their geographical or selling agents' territory in another group or where expiration dates as in periodical subscription lists or insurance lines the tabulation of governing dates or periods by two serial marks one of which belongs to each series—thus Aa, Ab and Ac. A 3" x 5" card arranged with two groups of eight governing members would give sixteen single selections or sixty four double selections over enough double sections for the expirations of a weekly periodical or five years of monthly insurance expirations. These same cards would be just as serviceable in selective containers operating without an inner tray, the positioning member 2 would movably engage with the trough like receiving means but in this case the lock rod would normally be in the upper portion of opening 2' and the elongated form of the opening permit the vertical movement incident to single or double subject selections, the rest-spaces 4 and 5 would engage with the rest ledges along the inner sides of the container and support the weight of the cards while in normal position and maintain the lower ends of any governing members just clear of the upper edges and in alinement with their respective selectors in the container. In this style of container the setting or actuating of a container selector will act directly and immediately upon a superimposed governing member by coming in contact therewith and raising it thus causing that side of the card to which it belongs to be pushed through the mass of contained cards to a distinctive position in having one corner elevated above the normal upper position, or if a selector in each group is actuated the whole card will be forced through and have its upper edge evenly raised above the mass of cards. The same variations of selections whether single or double can be made, the only difference being the dispensing with the manipulation of the cradle and the acting of the container selectors directly upon the governing members, the cards being the same and prepared in the same manner.

In Fig. 2 is shown a card 19 formed with a plurality of governing members $3^c$ and $3^d$, having rounded ends. Opposite each of the governing members are arranged apertures $17^c$ and $17^d$ for receiving governing member attachments in case the wrong governing member is removed. Arranged at the bottom edge centrally of the card is a locking rod opening $2'$ having a positioning member arranged adjacent thereof formed with an opening or slot 16 whereby the card may be placed on a locking rod or removed therefrom without the removal of the locking rod.

In Fig. 3 is shown a card 7 formed with governing members $3^a$ and $3^b$ cut out or formed as projections having rounded ends so as to be adapted for containers having selectors with grooves along their upper edges. This card is formed with a governing member $2^a$ and a suitable locking rod opening adjacent thereto.

In Fig. 4 is shown a card 28 having governing members $3'$ and $3''$ formed with concaved ends for receiving selectors having rounded upper surfaces. Arranged between pairs of the governing members are apertures $28^a$ and $28^b$ for receiving governing member attachments in case the governing members are not positioned at the right point. Secured to card 28 is a positioning member attachment $2''$ secured in position by projecting spurs 27 and $27^a$, and also securing members $27^b$ and $27^c$ arranged in recesses or orifices similar to the recesses and orifices shown in Fig. 7, except that the same are arranged adjacent the locking rod opening inclosed by the attachment. The attachment $2''$ is preferably cut from thin sheet metal and formed with a flange 42 surrounding the locking rod opening. The securing members $27^b$ and $27^c$ are in the form of winged turn buttons formed from metal and having an eyelet like projection extending from the hub portion which is slightly bent for holding the securing members in position.

In Fig. 5 will be seen a slightly modified form of the card shown in Fig. 3, in which is arranged apertures $29^a$ and $29^b$ opposite the respective governing members. Also a positioning attachment is provided similar to positioning attachment $2''$.

In Fig. 6 a still further modified form of the card shown in Fig. 3 is disclosed in which apertures $37^a$ are provided opposite the juncture of each two of the governing members $37^b$. A positioning attachment is provided similar to the positioning attachment $2''$ except that the same is arranged with a slot or opening 33 for permitting the cards to be placed in position and removed without removing the locking rod.

In Fig. 7 a slightly different form of card is presented in which the governing members are provided by attachments, the card being cut away or formed with notches 12 and apertures 13 for receiving attachments 20. Attachments 20 are held in position by a spur 21 and by a turn button 22. This form of card is also provided with an elongated locking rod opening and a slotted positioning member for permitting the ready removal and insertion of the card without removing the locking rod.

In Fig. 8 a card similar to the card shown in Fig. 7 is disclosed, except that the notches $31^b$ and apertures $31^a$ are positioned at the juncture of each alternate pair of governing spaces for receiving governing member attachments 23 arranged to have the contact portion 24 thereof extend over to one side for properly coming opposite the governing spaces. The governing attachment 23 is secured in position by a spur and turn button similar to attachment 20, and will therefore need no further description. This form of card is also provided with a positioning member similar to that shown in Fig. 4.

In Fig. 9 is a further slightly modified form of card to that shown in Figs. 7 and 8, in which substantially V-shaped apertures $14^a$ and $14^b$ are provided for receiving a filling-in attachment 15 which is formed with a spur, and also provided with a turn button arrangement. In this card the selectors are designed to pass up into the notches, and consequently not move the card unless a filling-in attachment as 15 is placed in the notch. This card is also formed with a locking rod opening and positioning member similar to that shown in Fig. 1.

Figs. 10 and 11 show cards formed with their pivotal points at one end near the upper edge, governing members on the ends upon which the pivotal point is located, and on the lower edge, a positioning member, and rests on the lower edge of the card. The cards are adapted to be moved upon their pivotal points until the cards are substantially removed from the container. When a locking rod is used the center of the same is located at the pivotal point of the respective cards so that the cards are locked in position, either when in the container in its normal position, or when swung around at its pivotal point. This class of cards may be for any of the purposes heretofore set forth, or may be used in any desirable way involving a single list of selections. Fig. 10 discloses a plan view of a card having its pivotal point at one end and near the upper edge and provided with an attachment 166 which is secured to the card at one end near the upper edge and formed with a locking rod opening 162 that has its center coincident with the pivotal point of the card. Positioned upon the end upon which the pivotal point is located and on the lower end of the card are governing members 165 clearly indicated and serially marked. Upon the lower edge of the card are provided rests 164 which are arranged to support the card when in its normal lowered position. In addition there is positioned on the lower edge of the card a positioning member 163 that is struck upon the arc of a circle with the center at the pivotal point of the card so that in any movement of the card the positioning member may be permitted to guide the card so that the selectors may always properly engage the governing members 165. Opposite each of the governing members 165 are provided apertures 170 for receiving governing member attachments in case any of the governing members 165 were accidentally removed when not desired to be removed. In Fig. 11 is disclosed a card similar to the card shown in Fig. 10, except that the governing members 165' are cut out and formed with concaved ends and the positioning member 172 is formed with a slot 173. This card is also formed with apertures 175 arranged opposite the juncture of each alternate governing member.

Fig. 12 is a plan view of a card having arc shaped ends with an aperture 132 provided for a locking rod at one end when the locking rod is used, the center of the aperture being coincident with the pivotal point of the card. The card is formed with a rounded end 133 in order to permit the freer pivotal movement of the card, and also permit the card to be moved around its pivotal point without allowing a large space in the container. On the end opposite end 133 are formed governing members arranged in the arc of a circle, the arc being struck upon the pivotal point of the card. Suitable rests are provided for the card, and also a positioning member 129.

Fig. 13 is a card formed with one end shortened or cut off in line with the pivotal point of the card, and is supplied with an attachment 97 in which is formed an aperture for accommodating a locking rod with its center coincident with the pivotal point of the card. Along the lower edge of the card is formed governing members 148 opposite which are arranged apertures 149 set opposite each pair of the governing members. A pair of rests 147 are provided in line with the line of severance of the governing members for properly supporting the cards when not in use.

In Figs. 14 and 15 are shown cards provided with the same characteristics as disclosed in the preferred form of card heretofore described, the principal difference in the cards shown in these two figures being the attachment 99 formed with a slot or opening 100. These cards are suitable for use in selector containers for making selections from a single group of subjects that are arranged by having their governing members grouped on the lower edge. The containers in which these cards are adapted to fit can be arranged so that the selectors are beneath the card for raising or supporting the individual cards when a selection is desired. In these figures positioning members are arranged in the same location at the lower corner of the card but constructed slightly different in order to accomplish the various results hereinafter more clearly set forth, but so positioned that the positioning members are formed in the shape of a segment of a circle whose center is coincident with the pivotal point of the card, and is formed to movably engage with a positioning means in a container having a trough shaped formation. This card is supplied with a group of indicated serially marked governing members 85 along the lower edge. The governing members 85 have shown along their upper ends a line of severance to indicate the correct place for the severance of the undesired governing members. This card is adapted to make only a single selection and is limited in the number of selections to the number of governing members 85 placed on the lower edge of the card. The card is also provided with rest spaces 83—83 having the same functions as heretofore described; namely, for supporting the card when in a normal position, and is arranged on the bottom edge in line with the line of severance of the governing members. The use of this card may be for the purpose heretofore set forth in regard to the preferred structure or any other use that may be found desirable. Any unused card can be taken for a new record, and by cutting away any governing members not necessary to insure the selection at will of any subject indorsed thereon the card will operate properly when the selectors of the container are operated so as to be brought in contact therewith.

In Fig. 16 is shown a plan view of a card cut to shape from the card stock so that the governing members are clearly indicated by their shape. The governing members are also serially marked, and their line of severance plainly defined. The shape of governing members shown in this view is simiply by way of illustration as many modifications can be made, the essential requisite being that each side projecting governing member provides an opportunity to project a container selecting bar under its lower edge, the lower edge being arranged to rest on a projected selector during a selected condition. The card is formed with a locking rod opening 59 and end governing members 58ª, together with rests 57.

In Fig. 17 is disclosed a card similar to the card shown in Fig. 16, except that instead of having governing members formed for primarily engaging selector bars it has formed notches and corresponding apertures for receiving governing attachments 78. There are also arranged notches 66ª and 66ᵇ at the lower end as well as rests 66ᶜ. The card is also formed with a governing member 46 that is formed by cutting out the lower end of the card in the shape of a semicircle for fitting over a suitable support in the container.

In all of the cards, both of the preferred and the modified forms, serial marking is provided, either in single groups or in a plurality of groups, together with clearly indicated lines of severance for removal of the various governing members, or where governing member attachments are provided lines for guiding and placing the attachments are provided.

What I claim is:

1. In a device of the character described, a card formed with a locking rod aperture, rest portions formed by notching out the lower corners of the card and serrated projections rigid with the card extending below the rest portions, the edge of the card having the projections being provided with orifices.

2. In a device of the character described, a card provided with a rod aperture, projections extending from the lower edge of the card on each side of the aperture, the lower edges of the projections being serrated, and rests formed on the lower edge of the card adjacent the outer projections, the card being provided with orifices on the edge provided with the projections.

3. In a device of the character described, a card formed with a locking rod aperture, a notched-out portion formed at each end on the lower edge, a notched-out central portion, and a rounded projection extending into said central notched-out portion.

4. A card for card indexes having a centrally located arcuate positioning member formed on one edge thereof, and a projection extending from said edge on each side of the positioning member.

5. A card for card indexes comprising a body, an arcuate member formed on one edge of the card for supporting said card as the latter rotates, and projections extending from the body of the card.

6. A card for card indexes having an arcuate positioning member thereon and having a rest portion on each side of the positioning member.

7. A card for card indexes having one edge thereof provided with an arcuate portion forming a positioning and supporting means, and having rest portions formed on the same side of the card carrying the arcuate portion, said arcuate portion adapted to support the card as the latter rotates, the center of the arcuate portion being the center about which the card rotates.

In testimony whereof I affix my signature in presence of two witnesses.

JOSEPH E. RALPH.

Witnesses:
KATE BUEREK,
FRANK ERN.